United States Patent [19]

Rosaen

[11] Patent Number: 4,495,823
[45] Date of Patent: Jan. 29, 1985

[54] BIDIRECTIONAL FLOW METER

[75] Inventor: Lars O. Rosaen, Hazel Park, Mich.

[73] Assignee: Universal Filters, Inc., Hazel Park, Mich.

[21] Appl. No.: 499,300

[22] Filed: May 31, 1983

[51] Int. Cl.³ ............................................. G01F 1/28
[52] U.S. Cl. ................................. 73/861.76; 73/195; 116/275
[58] Field of Search ........... 73/861.74, 861.75, 861.76, 73/195, 186; 116/275, 274

[56] References Cited

U.S. PATENT DOCUMENTS

| | | |
|---|---|---|
| 742,099 | 10/1903 | Thompson . |
| 2,725,550 | 11/1955 | Prior . |
| 3,910,114 | 10/1975 | Rosaen . |
| 4,073,189 | 2/1978 | Draper . |

*Primary Examiner*—Charles A. Ruehl
*Attorney, Agent, or Firm*—Gifford, Van Ophem, Sprinkle, Sprinkle & Nabozny

[57] ABSTRACT

A bidirectional fluid flow indicator comprising a housing having a fluid inlet and fluid outlet, first and second separated fluid passageways intermediate said inlet and said outlet, a vane pivotally secured across one of said first channel, a second vane pivotally secured across the opposite end of said second channel, an indicator secured to said vanes for rotation therewith whereby said flow meter indicates the fluid is flowing from said inlet toward said outlet when said second vane is displaced and indicates fluid flow from said outlet toward said inlet when said first vane is pivotally displaced by the fluid flow.

10 Claims, 4 Drawing Figures

BIDIRECTIONAL FLOW METER

BACKGROUND OF THE INVENTION

1. Field of the Present Invention

The present invention relates generally to the fluid flow monitoring devices, and more particularly to fluid flow meters of the type having a vane member positioned in a fluid flow path and movable in response to fluid flow through the path.

2. Description of the Prior Art

There are many types of previously known fluid flow monitoring having means for sensing the rate of fluid flow through the monitor housing, as well as means for providing a corresponding indication of the fluid flow rate sensed by the sensing means. A particularly advantageous form of fluid monitor comprises the type have a housing defining a flow path between a fluid inlet and an fluid outlet, and having a vane positioned within the path so that the vane position varies depending on the rate at which fluid flows through the housing. Such vane type fluid fow monitors are particularly advantageous for the reason that an indicator means, switches or pointer, can be directly coupled to the movable vane in order to provide a direct indication of the vane position, and thus avoids numerous moving parts which increase the expense and complexity of a flow monitoring device.

However, in the typical previously known vane type flow meters, the vane is resiliently biased toward a first position in which it closes the flow path through the flow meter. When fluid pressure against the vane opposes the resilient force retaining the vane in its first position, i.e. fluid flow from the inlet to the outlet of the flow path and the flow meter, the fluid force moves the vane and permits the fluid to pass through the flow meter. The rate of the fluid flow is registered on the indicator by corresponding movement of the indicator with the vane. However, once the vane has returned to its initial position, the fluid flow in the opposite direction is blocked because the vane closes the flow path through the flow meter. Thus, as long as the fluid flows only in one direction through the device, the flow rate can be properly indicated by the flow meter device.

However, in view of the foregoing, previously known vane type flow meters cannot be utilized in line with fluid conduits through which the direction of fluid flow changes. Rather, previously known fluid conduit systems in which fluid flows in opposite directions could not be monitored by a simple and inexpensive vane type flow meters unless a separate bypass conduit if fluidly connected to the line so that a second vane type flow meter can be installed to monitor flow in the opposite direction. Therefore the advantages of the previously known vane type flow meters are substantially offset by the need for separate bypass conduit in the fluid system as well as the added expense of an additional flow meter housing unit. Moreover, the separate units would each be attached to the separate conduits by connectors, and thus increases the costs and complexity in utilizing and assembling vane type flow meters in a two way fluid conduit system.

In addition, the previously known vane type flow meters are designed and produced with the indicator positioned so as to be visible from one side only. Thus, when a flow meter is installed in a bypass conduit in which fluid flows in a direction opposite to fluid flow through the main conduit, the indicators face opposite directions. Thus, the position of a viewer must be changed in order to view one or the other indicators since both meters cannot be viewed from the same position unless extensive reengineering and shaping of the bypass conduit is undertaken.

SUMMARY OF THE PRESENT INVENTION

The present invention overcomes the above-mentioned disadvantages by providing a flow meter housing having a flow path bifurcated into two separate channels, each channel having an independently operable vane intermediate single inlet and outlet ports. Preferably, each vane is directly coupled to a separate indicator which provides visible indication of the position of the respective vane. Moreover, in the preferred embodiment, both indicators are secured to the same side of this meter housing. However, both channels are fluidly connected to a single inlet at one end of the housing and a single outlet at the other end of the housing to minimize the number of fluid couplings necessary in order to connect the flow meter in a fluid system.

Thus, the present invention provides a flow meter which can be connected in line to an existing fluid flow system, which provides an indication of the amount or rate of fluid flow through a fluid system regardless of the direction in which the fluid is flowing through the system. Thus, the flow meter of the present invention enables the advantages of a vane type flow meter to be applied in a bidirectional flow conduit and avoids the need for bypass lines previously required to employ the previously known vane-type flow meters in a bidirectional flow system. Thus, the present invention also avoids the need for a plurality of couplings which can be the source of leakage in the fluid system and the extensive rerouting of a bypass line to permit indicators to face in the same direction, as would be necessary by the construction of previously known vane type flow meters. Moreover, the flow meter of the present invention simplifies the installation of flow meters in a bidirectional fluid system, and thus not only reduces the costs of components used but also the time necessary to install the components in a bidirectional fluid conduit line. The present invention also provides readily visible means for indicating the direction in which fluid is flowing through the device, as well as the amount or rate of fluid flow by providing a predetermined alignment of separate indicator means for each vaned passageway in the flowmeter.

BRIEF DESCRIPTION OF THE DRAWINGS

The present invention will be more clearly understood by reference to the following description of the preferred embodiment, when read in conjunction with the accompanying drawings in which like reference characters refer or like parts throughout the views, and in which.

DETAILED DESCRIPTION OF A PREFERRED EMBODIMENT OF THE PRESENT INVENTION

Figure 1:
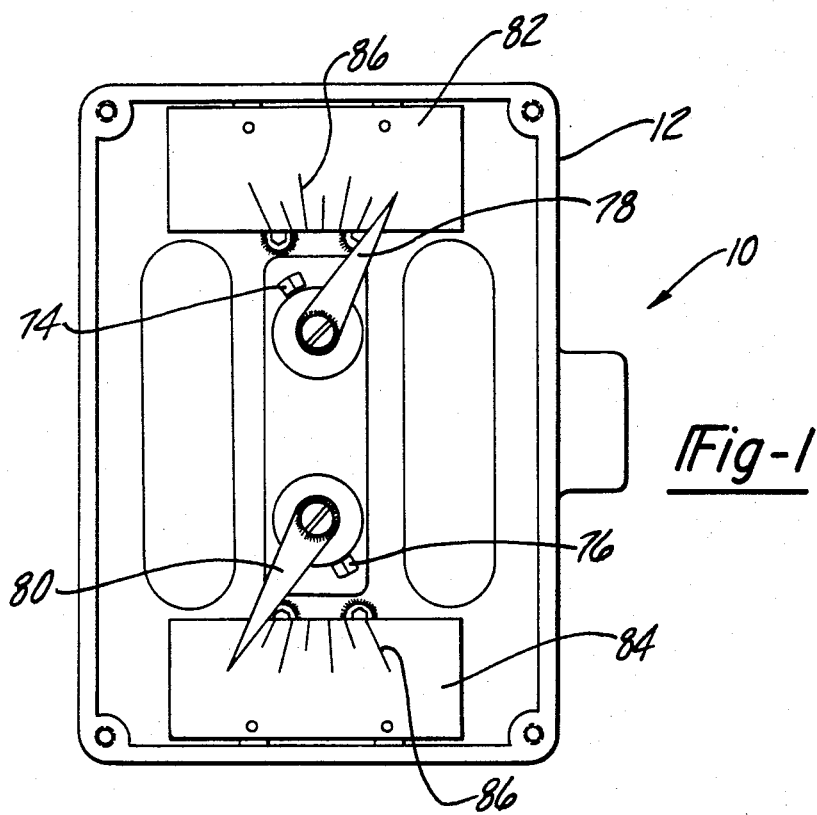
FIG. 1 is a front plan view of a flow meter in accordance with the present invention.
Figure 2:
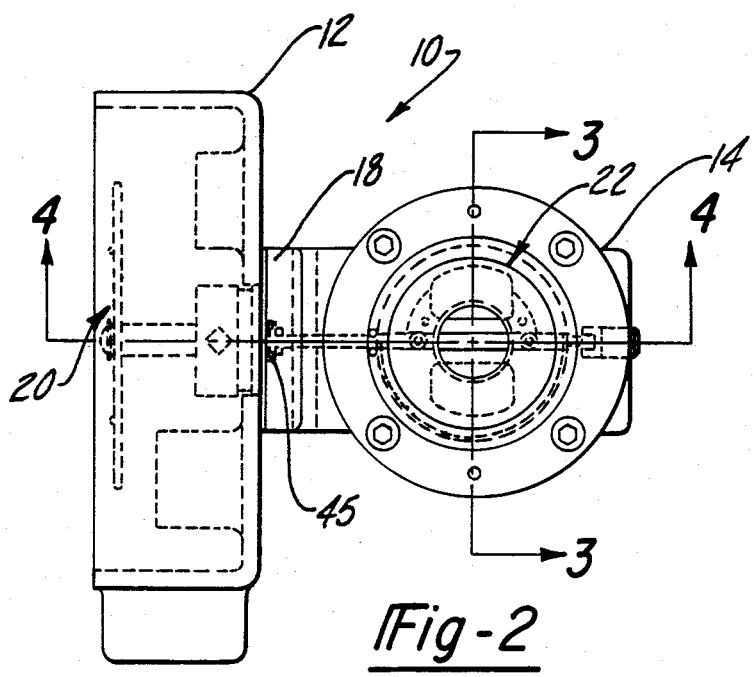
FIG. 2 is a top plan view of the flow meter shown in FIG. 1.
Figure 3:
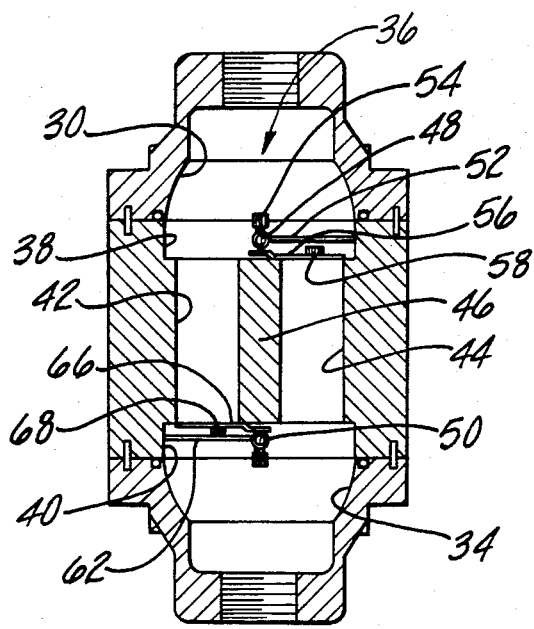
FIG. 3 is a sectional view taken substantially along the line 3—3 in FIG. 2.

Referring first to FIGS. 1 and 2, a flow meter 10 according to the present invention is thereshown comprising an indicator housing 12 secured to a flow meter housing 14. The indicator housing 12 is secured through its back wall by bolts 16 (see FIG. 4) to an end flange 18 of the flow meter housing 14. In addition, an indicator means within the indicator housing 12, designated generally at 20 in FIG. 3, is operatively connected to a vaned flow passage means, designated generally at 22 in FIG. 2, by appropriate means to be discussed in detail hereafter.

Figure 4:
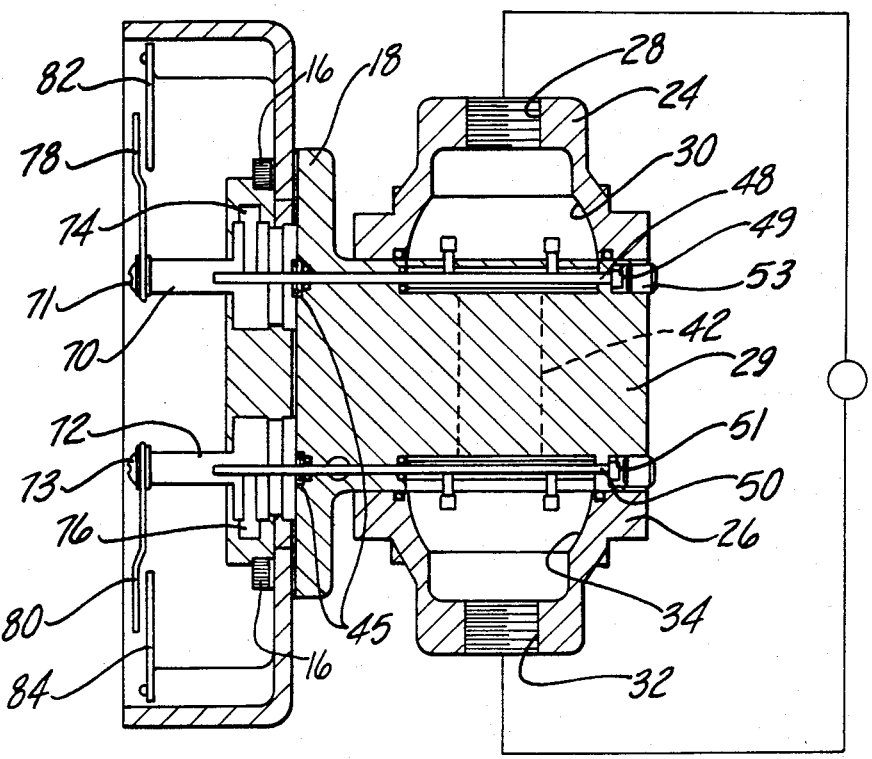
FIG. 4 is a sectional view taken substantially along the line of 4—4 in FIG. 2.

As best shown in FIG. 4, the flow meter housing 14 includes an upper cap 24, a lower cap 26 and main housing portion 29 which includes connection flange 18 at one end. The upper housing cap 24 includes an inlet opening 28 in fluid communication with an inlet chamber 30 and disposed over one end of the main body portion 29. Similary, lower cap 26 includes an outlet aperture 32 in fluid communication with an outlet chamber 34. The caps 24 and 26 are secured to opposite ends of the main body portion 29 to form the fluid inlet 28 and outlet 32 respectively, for the flow meter 10. While the terms inlet and outlet are used to designate the difference between the opening 28 and opening 32, respectively, in the flow meter housing 14, it is to be understood that the terms are not used in a limiting manner and do not indicate the direction in which the fluid flows through each opening. Rather, it is to be understood that fluid can flow into and out of each opening 28 and 32, but that the terms inlet and outlet are used to simplify the manner in which the flow meter and its operation are to be described.

The inlet chamber 30 and the outlet chamber 34 are in fluid communication with each other by means of passage means 36 (FIG. 3) in the main body portion 29 of flow meter housing 14. In particular, the passage means 36 comprises bore portions 38 and 40 at the top and bottom respectively with the main body portion 29, as well as intermediate fluid channels 42 and 44 separated by housing wall 46 (see FIG. 6). Two elongated pivot pins 48 and 50 are rotatably journaled by means such as the bearing 45 in elongated bores in the main body portion 29 at opposite ends of the wall 46. As best shown in FIG. 4, the elongated bores include enlarged bore portions 49 and 51, respectively, at one end for installing the pins 48 and 50 therein. A vane 52 includes a tubular collar adapted to receive the pivot pin 48 and having transverse, threaded apertures which receive threaded fasteners 54 for securing the vane 52 to pivot pin 48 for rotation therewith. A sealing plate 56 forms a fluid seal between the collar of the vane 52 and the end of the intermediate wall 46 and includes an abutment stop 58 to limit rotation of vane 52 toward the channel 44. The sealing plate 56 is substantially the same as the sealing plate described in U.S. Pat. No. 4,346,607 and will not be described in further detail in the present application for the sake of brevity. Appropriate means (not shown) resiliently retains the vane 52 in position against the abutment stop 58. The vane 52 is appropriately sized to seal with the peripheral wall of the enlarged bore portion 38 so as to completely fluidly seal channel 44 from the inlet chamber 30 when the vane 52 is at its normal rest position.

Similarly, a vane 52 includes a tubular collar which receives the other pivot pin 50 therethrough and which includes threaded apertures through which threaded fasteners 54 lock the vane 62 into engagement with the pivot pin 50. Sealing plate 66, substantially the same as sealing plate 56, includes an abutment stop 68. Appropriate means (not shown) resiliently urges the vane 62 against the abutment stop 68, and the vane 62 is appropriately sized to seal against the periphery of the enlarged bore portion 40 when the vane 62 is in its normal rest position.

Referring now to FIG. 4, each pivot pin 48 and 50 extends outwardly from main body portion 29 past flange 18 and extends into the indicator housing 12 through an appropriate aperture. Within the housing 12, pointer supports 70 and 72 are secured by set screws 74 and 76, respectively, to the pivot pins 48 and 50 for rotation therewith. A pointer 78 is secured to the end of the pointer support 70 by a threaded fastener 71 so as to extend radially outwardly from the support. Likewise, pointer 80 is secured to support 72 by threaded fastener 73, so as to extend radially outward from the support. Each pointer 78 and 80 extends outwardly toward a scaled face plate 82 and 84, respectively, secured within the housing and facing outwardly from the open front end of the indicator housing 12. As best shown in FIG. 1, each face plate can include indicia 86 defining spaced gradations which provide an indication of the degree to which the pointers 78 and 80, and thus their respective vanes, have been rotated.

Having thus described the important structural features of the present invention, the operation of the device is easily described. First of all, the flow meter 10 is easily assembled by securing the sealing plates 56 and 66 to opposite ends of the main body portion 29 of the flow meter housing 14. The vanes 52 and 62 are then positioned in the enlarged bore portions 38 and 40 respectively, and the pivot pins 48 and 50 are inserted through the enlarged openings 49 and 51 in the end of housing portion 29 and through the tubular collar in the vanes 52 and 62 so as to extend outwardly from the opposite end of the housing portion 29. End caps 53 can then be lodged in the openings 49 and 51 to retain the pivot pins 48 and 50 in their position. With the vanes 52 and 62 resting against the abutment stops 58 and 68, respectively, the set screws 54 are tightened to lock the vanes 52 and 62 to their respective pivot pins 48 and 50. The upper housing cap 24 is then secured to one end of the body portion 29 while the lower cap 26 is secured to the opposite end of the main body portion 29. Threaded inlet opening 28 can then be secured by an appropriate fluid coupling to a fluid conduit system, while the outlet opening 32 is similarly coupled to the other end of the fluid conduit system.

Once the indicator housing 12 has been secured by bolts to the flange 18, the pointer supports 70 and 72 are slid over the ends of the pivot pins 48 and 50 respectively and secured in position by the set screws 74 and 76 respectively. The pointers 78 and 80 secured to the ends of the supports 70 and 72, respectively, so as to indicate a no flow condition on the face plates 82 and 84 respectively. Since the vanes 52 and 62 are resiliently urged toward the normal resting positions, any movement of the vanes 52 and 62 would thereby be directly indicated by the position of the pointers 78 and 80, respectively, by position along the face plates 82 and 84, respectively, which are rigidly mounted on the housing 12.

When the fluid flow system is operative, fluid introduced through the inlet 28 flows into chamber 30 and thus into enlarged bore portion 38 of the main body portion 29. Since the vane 52 blocks fluid flow through the channel 44, the fluid will be forced to flow through channel 42 against the vane 62, thus causing the vane 62 and the pivot pin 50 to rotate about the axis of the pivot pin 50. At the same time, the pointer 80 will be pivoted about the same axis and provide a visible indication against the face plate 84 of the corresponding vane position and thus, the amount or rate of fluid flowing through the housing 14.

Conversely, when the direction of fluid flow is reversed, and the fluid is forced into the outlet end 32 of the fluid flow meter 10, the vane 62 will block the flow of fluid through the channel 42. The fluid is forced to flow through the channel 44 and against the vane 52. Thus the vane 52 will be forced to pivot about the axis of the pivot pin 48, whereby a corresponding rotation of the pointer 78 occurs, and the degree of displacement is exhibited by the position of the pointer with respect to face plate 82.

Thus, will be understood that when fluid flows from the inlet 28 to the outlet 32, the pointer 80 provides an indication that fluid enters the meter 10 from the top of the flow meter housing 14. In addition, it indicates the degree to which the vane has been displaced by the fluid flow. Alternatively, when fluid is flowing from the outlet 32 toward the inlet 28, the pointer 78 indicates that fluid enters the meter 10 from the bottom of the flow meter housing 14. In addition, the pointer indicates the degree of displacement of the vane caused by the flow of fluid through the housing.

As a result, the present invention provides a flow meter which indicates the direction in which fluid is flowing through a bidirectional fluid system as well as the flow rate of the fluid flowing through the system. Thus, it is not necessary to install separate meters for each direction of flow, and only two fluid couplings are necessary to secure the flow meter to the system. Accordingly, the present invention avoids the need for a bypass conduit which was previously necessary in bidirection fluid systems. Moreover, it is not necessary to reverse the position of the inlet and the outlet of the flow meter in order to obtain an indication of the flow rate in the fluid system. Thus, the present invention avoids the need for time consuming reversal of the flow meter within the flow system or alternatively, installation of a bypass line to include a separate flow meter, in a bidirectional flow system. Moreover, the indicators of the invention are readily visible from the same vantage point, so that the flow conditions are readily apparent regardless of the direction of flow in the fluid system.

Having thus described the present invention, many modifications thereto will become apparent to those skilled in the art to which it pertains without departing from the scope and spirit of the present invention as defined in the appended claims.

What is claimed is:

1. A bidirectional fluid flow indicator comprising:
a housing having a fluid inlet and a fluid outlet, and having means for defining separated first and second fluid passageways intermediate said inlet and said outlet, a first end of each of said first and second passages being in fluid communication with one of said inlet or said outlet, a second end of each said first and second passage being in fluid communication with the other of said inlet or outlet;
a first vane and means for pivotally securing said first vane across said first end of said first passageway so that said first vane is pivotable to and from a first position at which said first vane closes said first passageway when fluid flows in a first direction between said inlet and said outlet, and a second position at which said first vane opens said passageway as fluid flows in a second, opposite direction between said inlet and said outlet;
a second vane, and means for pivotally securing said second vane across said second end of said second passageway so that said second vane is pivotable to and from a first position at which said second vane closes said second passageway when fluid flows in said second opposite direction between said inlet and said outlet, and a second position at which said second vane opens said second passageway when fluid flows in said first direction between said inlet and said outlet;
wherein said second position of said first and second vanes is variable and dependent upon the amount of fluid flowing between said inlet and said outlet;
first indicating means for indicating the position of said first vane exteriorly of said housing; and
second indicating means for indicating the position of said second vane exteriorly of said housing.

2. The invention as defined in claim 1, wherein said housing defines a first chamber intermediate said inlet and said first and second passageways.

3. The invention as defined in claim 1, wherein said housing defines a chamber intermediate said outlet and said first and second passageways.

4. The invention as defined in claim 1, wherein each of said first and second indicating means comprise visible means for visually representing the position of its respective vane.

5. The invention as defined in claim 4, wherein each said visible means is positioned on the same side of said housing.

6. The invention as defined in claim 4, wherein said indicating means comprises a second housing, means for mounting said visible means in said second housing, and means for securing said second housing to said first housing.

7. The invention as defined in claim 1, wherein said first vane is secured to a first shaft, said second vane is secured to a second shaft, and wherein said housing includes means for rotatably securing said first shaft in said housing, and means for rotatably securing said second shaft in said housing.

8. The invention as defined in claim 7, wherein a portion of each of said first and second shafts extend outwardly from said housing, and wherein said first and second indicating means each comprises a pointer secured to the extended portion of each said first and second shaft.

9. The invention as defined in claim 1, wherein said housing comprises a peripheral wall defining a chamber and further including an intermediate housing wall bisecting said chamber to form said first and second passageways on opposite sides of said housing wall.

10. The invention as defined in claim 9, wherein said means for pivotally securing said first vane, and said means for pivotally securing said second vane are disposed adjacent opposite ends of said intermediate housing wall.

* * * * *

UNITED STATES PATENT AND TRADEMARK OFFICE
CERTIFICATE OF CORRECTION

PATENT NO. : 4,495,823
DATED : January 29, 1985
INVENTOR(S) : Lars O. Rosaen

It is certified that error appears in the above—identified patent and that said Letters Patent is hereby corrected as shown below:

Column 3, line 11 delete "FIG. 3" insert --FIG. 2--.

Column 3, line 43 delete "(see FIG. 6)" inser t --(see FIG. 3)--.

Column 3, line 67 delete "52" insert --62--.

Signed and Sealed this

Twenty-fifth Day of June 1985

[SEAL]

Attest:

DONALD J. QUIGG

Attesting Officer — Acting Commissioner of Patents and Trademarks